United States Patent [19]
Laha et al.

[11] Patent Number: 5,490,253
[45] Date of Patent: Feb. 6, 1996

[54] MULTIPROCESSOR SYSTEM USING ODD/EVEN DATA BUSES WITH A TIMESHARED ADDRESS BUS

[75] Inventors: Subhasis Laha, Lisle; Dennis J. Thompson, Geneva, both of Ill.

[73] Assignee: AT&T Corp., Murray Hill, N.J.

[21] Appl. No.: 80,600

[22] Filed: Jun. 24, 1993

Related U.S. Application Data

[63] Continuation of Ser. No. 529,051, May 25, 1990, abandoned.

[51] Int. Cl.$^6$ .................. G06F 13/36; G06F 13/362; G06F 13/368; G06F 13/40
[52] U.S. Cl. .................. 395/304; 395/287; 395/821; 395/460; 395/293; 395/297; 364/231.4; 364/240.2; 364/DIG. 1
[58] Field of Search .................. 364/200 MS File, 364/900 MS File; 395/325, 425, 800

[56] References Cited

U.S. PATENT DOCUMENTS

| | | | |
|---|---|---|---|
| 4,445,172 | 4/1984 | Peters et al. | 395/425 |
| 4,481,572 | 11/1984 | Ochsner | 395/325 |
| 4,594,682 | 6/1986 | Drimak | 395/800 |
| 4,620,275 | 10/1986 | Wallach et al. | 395/800 |
| 4,622,631 | 11/1986 | Frank et al. | 395/800 |
| 4,736,293 | 4/1988 | Patrick | 395/425 |
| 4,740,894 | 4/1988 | Lyon | 395/425 |
| 4,799,152 | 1/1989 | Chuang et al. | 395/800 |
| 4,884,190 | 11/1989 | Ngai et al. | 395/800 |
| 4,888,682 | 12/1989 | Ngai et al. | 395/800 |
| 4,928,225 | 5/1990 | McCarthy et al. | 395/425 |
| 5,029,070 | 7/1991 | McCarthy et al. | 395/425 |

OTHER PUBLICATIONS

J. Archibald et al., "Cache Coherence Protocols: Evaluation Using a Multiprocessor Simulation Model", *ACM Transactions on Computer Systems*, vol. 4, No. 4, 1986, pp. 273–298.

M. S. Papamarcos et al., "A Low–Overhead Coherence Solution For Multiprocessors With Private Cache Memories", *Proc. 11th Annual International Symposium on Computer Architecture*, 1984, pp. 348–354.

P. Sweazey et al., "A Class Of Compatible Cache Consistency Protocols And Their Support By The IEEE Futurebus", *Proc. 13th Annual Symposium on Computer Architecture*, Jun. 3–5, 1986, Tokyo, Japan, pp. 414–423.

T. Lovett et al., "The Symmetry Multiprocessor System", *Proc. 1988 International Conference on Parallel Processing*, pp. 303–310.

*Primary Examiner*—Tod R. Swann
*Assistant Examiner*—James Peikari
*Attorney, Agent, or Firm*—Werner Ulrich; Dennis J. Williamson

[57] ABSTRACT

Bus arrangements are disclosed for interconnecting processors and main memory modules of a shared memory multiprocessor system. A single address bus interconnects all processors and memory modules, but odd and even memory modules communicate data to and from the processors via an odd and an even data bus. Each reading of memory occupies four bus cycles on one of the data buses. On the address bus, two of each of the four cycles are available for addressing odd and even memory modules, and the other two are available for sending invalidation addresses to the caches of the processors. The single address bus is used for transmitting a relatively narrow (32-bit) address word throughout the system, one address on each bus cycle, while the data buses are time shared to transmit a wide data word (256-bit) in four bus cycles, and each data bus is only connected to half of the main memory modules. Such an arrangement makes efficient use of limited bus resources to transmit information when and where it is needed.

18 Claims, 2 Drawing Sheets

| | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| EVEN GRANT | P6 | | P4 | | P2 | | P7 | | | | | | | | | | |
| ODD GRANT | | P3 | | P5 | | P8 | | P4 | P3 | | | | | | | | |
| ADDRESS BUS | P1 | P6 | P3 | P4 | P5 | P2 | P8 | P7 | P4 | | | | | | | | |
| ODD DATA | | | | | $P1_1$ | $P1_2$ | $P1_3$ | $P1_4$ | $P5_1$ | $P5_2$ | $P5_3$ | $P5_4$ | $P4_1$ | $P4_2$ | $P4_3$ | $P4_4$ | |
| EVEN DATA | | | | | | $P6_1$ | $P6_2$ | $P6_3$ | $P6_4$ | $P2_1$ | $P2_2$ | $P2_3$ | $P2_4$ | $P3_1$ | $P3_2$ | $P3_3$ | $P3_4$ |
| SNOOP IN RESPONSE TO | | | | | | P3 | P5 | P4 | P8 | P7 | P4 | P3 | | | | | |
| | | | | | | | SHARED | | | | | MODIFIED | | | | | |

MULTIPROCESSOR SYSTEM USING ODD/EVEN DATA BUSES WITH A TIMESHARED ADDRESS BUS

This application is a continuation of application Ser. No. 529,051, filed on May 25, 1990, now abandoned.

TECHNICAL FIELD

This invention relates to bus arrangements in multiprocessor data processing, telecommunications or computer systems.

Problem

For modem data processing systems, an increasingly popular type of arrangement is one in which the system grows from a small system to a larger one by the addition of processor modules and memory modules to the smaller system. Such arrangements permit a business to start out with a small number of processors and memory modules and, as the needs of the business expand, to add processors and memory modules in order to handle the additional data processing load. As additional processors and memory modules are added, the software, which is frequently the most expensive part of the system, can be preserved so that the added capacity can be achieved without reprogramming the system.

In such a system, the bus arrangement used by the processors to access the memories is frequently a bottleneck. In the typical bus arrangement of the prior art, sometimes called a tenured bus arrangement, a single memory controller is used for controlling all main memories. This single memory controller is accessed by any of the processors, one at a time. When such a processor accesses the memory controller (and thereby the memory) the other processors may not perform main memory access operations. The other processors may, during this entire period, be working on other processes using their own internal cache memories but must halt their operations when a main memory access is needed. Such an arrangement, while inexpensive, is also inefficient in that the processors which are locked out of accessing the memory frequently must halt in their operations so that only a fraction of their data processing capabilities can be utilized. Computer simulations have shown that such an arrangement typically cannot grow beyond about five processors, even if each processor has a relatively large cache; effectively, six processors have very little added processing capacity compared with five processors.

Another arrangement which has been proposed is that of a split transaction bus. A number of processors can access this bus which in turn can access a number of memory controllers. A processor accesses this bus to send an address to a memory controller and then releases the bus for use by another processor. The memory controller then accesses the memory and, when a memory access has been completed, either the same bus or a separate response bus is seized and the data which has been tagged with the identity of the requesting processor is returned to the processor. This arrangement was perhaps desirable at the time when processor actions were very much faster than memory actions, but with the current main memories offering reading times on the order of 60 nanoseconds, such an arrangement has little to offer since the time to make the bus available for use by other processors is comparable to the reading time. A split transaction bus can be made more efficient by the use of pipelining wherein a processor accesses a bus at one interval and reserves an access on that bus during a second interval for the response from a memory controller. Both the split transaction arrangement and the pipeline bus are considerably more expensive than a tenured bus and continue to have substantial limitations on the total throughput of the bus thus creating a bottleneck to system performance when the number of processors exceeds about ten.

A problem in the use of processors each having its own internal cache memory is that if one processor is working on a particular block of memory in its own cache at the same time as a second processor is accessing that block of memory from the main memory, it is necessary that the requesting processor be notified of this conflict. Therefore, before any reading of main memory can take place, the address must be sent to all processors so that these processors can check whether the particular address is that of data currently modified in the cache of any of these processors. If not, memory can be accessed in the conventional manner. If so, the requesting processor must be notified and the cache which has the block of memory is requested to write the contents into memory. The requesting processor can subsequently access the main memory and get its information. If a block of memory is shared in the caches of two or more processors and one modifies that block, the other processors must be notified that their copy of this block of memory is no longer valid. The need for making such a check and for sending an invalidating signal to a processor to warn it against using the contents of its cache copy of a segment of memory is an essential requirement for a shared main memory multiprocessor system.

For some very high performance multiprocessor systems, a plurality of buses is used to interconnect a plurality of processors with a plurality of memory controllers. Such arrangements tend to be very expensive since each processor and memory controller must deal with multiple buses and appropriate queuing and locking arrangements must be provided in each memory controller and each processor to allow for parallel access to the various buses.

A problem in the prior art is that there is a need for an economical, efficient bus arrangement for providing access to a substantial plurality of main memory modules from a substantial plurality of processor modules and for communicating cache invalidation data among the processors.

Solution

The above problem is solved and an advance is made in the state of the art in accordance with the principles of our invention wherein a plurality of processors access a single address bus connected to all of the plurality of memory modules, and the memory modules respond on a plurality of data buses. None of the data buses are connected to all of the memory modules. In one specific embodiment, the memory modules are divided into even and odd modules wherein the even modules respond on an even data bus and the odd modules respond on an odd data bus. The data buses are also used for writing into the memory modules.

In accordance with one aspect of the invention, the address is sent not only to the memory controllers but also to the processors to allow these processors to check whether data corresponding to a given address is already stored in a cache of that processor. If this is so, then that processor responds on a separate snoop bus with a signal indicating that the information exists in a cache of one of the processors and indicating the status of that information. If that information has, in fact, been modified, then the data that has been requested by the requesting processor is supplied not by the main memory but by the processor in whose cache this data has been found.

Each such address is sent during a single clock cycle on the address bus and the response to that address is sent back during four clock cycles on one of the data buses. Since the data word is wider than the address word, a single data bus can be used to return a data word wider than the data bus to a processor without loss of clock cycles on the address bus. A plurality of data buses provide the opportunity for more fully utilizing bus resources for a broad range of system parameters.

An arbitration bus is used to help select which processor can get access to the address bus. During each odd phase of the clock the arbitration bus is used for helping to select the next processor for transmitting an even address and during each even phase the arbitration bus is used to help select the processor for transmitting the next odd address. The arbitration function is both centralized and distributed. Each processor receives request signals from all the other processors; the local arbiter in each processor determines whether its processor can use the next available clock pulse. The centralized arbiter gives additional permission information over the arbitration bus in order to allow for functions such as granting permission for an access or locking a tentatively selected processor out of access to the addressing bus while a previously selected processor completes an uninterrupted multiple access action. The arbitration arrangement is such that all processors which have requested access to one of the even or odd phases at the beginning of an arbitration cycle are served once before the beginning of the next arbitration cycle.

The bus frequency is one-half the basic clock frequency of the individual processors. As faster processors are developed, these processors can also be adapted to access the bus by using one-third or one-quarter the clock rate of these new processors. Further, these new processors are combinable with older processors working at the older clock rates if the clock is derived from some common source.

A MESI (Modified, Exclusive, Shared, Invalid) protocol is used for cache coherency. M is a state indicating that the information in the cache has been modified. E is a state indicating that the copy in cache is exclusive (i.e., no other cache may contain information for this block of memory). S is a shared state indicating that the information in the cache may be shared with information in another cache. I is a state indicating invalid information, i.e., that the information in this cache block cannot be used without updating from memory. This protocol is common in the industry and is especially adaptable to the type of bus arrangement of applicants' invention. Knowledge of these states is necessary to report invalidation to other processors; to invalidate cache entries when an address is detected on the address bus; to change status from exclusive or modified to shared when another processor fetches the corresponding data; and to keep track of whether data in the cache has been modified.

A controller of a disk or other peripheral device, is treated as if it were a processor. Whenever main memory is updated from the disk, this processor sends out invalidation signals for all addresses which are being updated in the main memory.

This type of arrangement allows for the use of an industry standard cache coherency scheme with an inexpensive high-performance bus interconnection scheme for interconnecting a plurality of processors and a plurality of memory controllers.

The address bus is used to transmit addresses for both memory reading and invalidation requests. A memory request occupies four bus cycles on the data bus to transmit a response. An address is transmitted using one bus cycle; since there are two data buses, memory read/write requests can only be made every two bus cycles. Any bus cycles not used for memory addressing are available for transmitting invalidation addresses.

DETAILED DESCRIPTION

Figure 1:
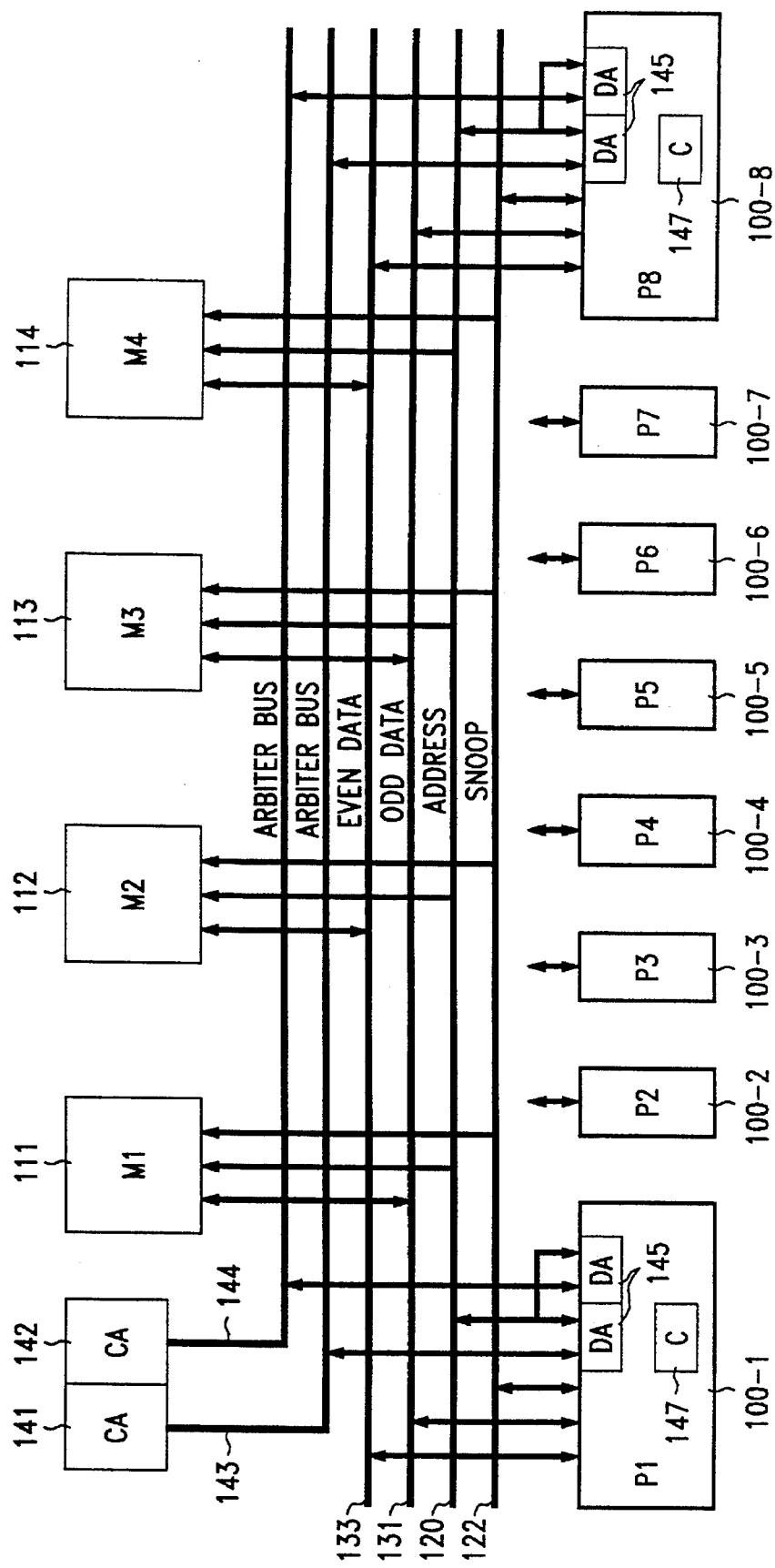
FIG. 1 is a block diagram of an exemplary multiprocessor system using the bus arrangement of applicants' invention.

FIG. 1 is a block diagram showing a bus interconnection scheme for interconnecting eight processors and four memory modules. Each memory module includes its own controller. The eight processors 100-1, . . . , 100-8, also referred to as P1, . . . ,P8, each connected to the memory access buses, i.e., the common address bus 120, an odd data bus 131, and an even data bus 133. The memory modules are each connected to the address bus 120 and to only one of the two data buses 131, 133. In this case, memories 111 and 113 are connected to the odd data bus 131 and memories 112 and 114 are connected to the even data bus 133. The address bus is used for addressing both the memory modules and for informing the caches 147 in each of the processors about the address being accessed in main memory. If a memory address is transmitted to main memory and this memory address matches an address stored in a cache of one of the other processors, the following actions are taken: if the cache entry is identified as being "M", modified, the modified data from the cache of that processor is returned to the requesting processor over the appropriate odd or even data bus and the main memory is also simultaneously updated. If the cache entry is marked E for exclusive, then the E state is changed to S for shared state and the memory is accessed to obtain the information; in this embodiment it is preferable to access the memory instead of the other cache, thereby avoiding a possible interruption of the operations of the other processor. If the cache entry entry is in the shared ("S") state, the requesting processor is informed and will then mark its own version of the accessed memory in its own cache as shared. If there is no currently valid cache copy of the data, no action is required.

If the processor accessing main memory is performing the accessing using a read for modify signal, then if a processor which contains another copy of that memory in its cache is in the modified state, that processor will supply the data to the requesting processor and will mark its cache copy of that data invalid; if the other processor has a copy of the memory in its cache in the E (exclusive) or S (shared) state, then that cache entry is marked invalid. If a processor accesses data which is not present in its own cache, the processor must get this data from either the main memory or one of the other caches as described above. The processes of dealing with data that is retained in a main memory and that may be retained in the cache of one or more processors, using the MESI protocol, is well understood in the prior art and is described, for example, in J. Archibald, J. Baer, "Cache Coherence Protocols: Evaluation Using a Multiprocessor Simulation Model", ACM Trans. on Comp. Systems, Vol. 4, No. 4, 1986, pp. 273–298; M. S. Papamarcos, J. H. Patel, "A Low Overhead Coherence Solution for Multiprocessors with Private Cache Memories", Proc. 11th Annual Int'l. Symp. on Computer Architecture, 1984, pp. 348–354; P. Sweazy, A. J. Smith, "A Class of Compatible Cache Consistency Protocols and their Support by the IEEE Futurebus", Proc. 13th Annual Int'l. Symp. on Computer Architecture, 1986, pp. 414–423.

An arbitration scheme is required to select which of several processors requesting access to the address bus can be given such access. This arbitration scheme requires both a pair of centralized arbiters 141 and 142, with outputs 143 and 144, respectively, for controlling arbitration for the odd and even clock cycles of bus 120, and a distributed set of arbiters 145, two in each processor. Each centralized arbiter (FIG. 3) has two outputs: a grant output indicating that whichever processor is selected by its internal distributed arbiter for accessing the bus, can in fact access the bus; and a lock output which grants access to the processor that had been previously granted access for an additional memory access cycle in order to permit this processor to have two or more consecutive accesses to the same memory module, or even to different modules, without any intervening actions by other processors. The inputs to each centralized arbiter are a common request signal which is low (open collector "or" circuit) if any of the processors are requesting access to the bus, a lock signal from the addressing bus 120 indicating that the previous action was one in which the processor wishes to retain control of the bus for another cycle by locking out other processors, a read/write signal to indicate that the bus action is for accessing main memory or for transporting data from the cache of one processor to the requesting processor, and an invalidation signal for indicating that information in other caches for the address on the address bus should be marked invalid.

Sometimes it is necessary to modify data that crosses cache line boundaries. In that case, it is necessary to lock both the even and odd buses to prevent other processors from accessing any part of this data. The buses are locked until the transaction has been completed. Invalidation signals are sent for both cache lines.

A pair of distributed arbiters 145 (FIG. 4) exists in each of the processors for accessing the address bus for even and odd cycles. The inputs are an internal read/write request signal, a coded priority signal indicating the next processor which may be admitted to have access to the bus, a priority level signal indicating the priority level of this processor, and the grant and lock signals from the centralized arbiter. The output is an enable signal to enable the processor to access the address bus, i.e., to begin its bus transaction.

Figures 2, 3, 4:
FIG. 2 illustrates the use of intervals on the time shared buses of the arrangement.
FIG. 3 illustrates the signals processed by a central arbitrator for selecting among the processors to access the address bus.
FIG. 4 illustrates the signals processed by a distributed arbitrator for selecting among the processors to access the address bus.

A bus arrangement having in each of several leads alternately connected and unconnected segments of length 1, 2, 4, 8 is used to interconnect the processors. Such an arrangement, as shown in U.S. Pat. No. 4,597,084, FIG. 3 is used to transmit or not transmit an inhibit signal from each processor trying to seize the address bus in such a way that only the processor of highest rank seeking to seize the bus is able to do so and all other processors of lower rank are inhibited from seizing the bus. A memory request occupies four bus cycles on the data bus to transmit a response. An address is transmitted using one bus cycle; since there are two data buses, memory read/write requests can only be made every two bus cycles. The remaining bus cycles are available for sending addresses for invalidation requests. Advantageously, such an arrangement makes further efficient use of the address bus.

In this embodiment, the address bus is 32 bits wide and operates at a bus cycle of 60.6 nanoseconds, equivalent to a 16.5 MegaHerz clock. Each cache line is 32 bytes wide, and matches the entity read from main memory for one address. Each data bus is 64 bits wide, and can transmit a 32 byte reading in four bus cycles. The memory modules are organized to read 128 bits (16 bytes) for each accessing operation, and perform two accesses in response to each received address. In order to minimize wait time by the requesting processor, the contents of the specific byte which is addressed are delivered on the first of the four bus cycles required to deliver the contents of a full cache line.

FIG. 2 contains a timing diagram with an illustrative example of the use of the various buses. The timing signals are alternately odd and even as defined by signals from centralized arbiters 141 and 142. Addresses for odd memory modules may only be transmitted on odd cycles and addresses for even memory modules may only be generated on even address cycles.

The top two lines on the timing chart shows that the even arbitrator generates its outputs during odd clock intervals and that the odd centralized arbitrator generates its outputs during the even clock intervals, and shows the identity of the processors selected by their internal arbiters in response to the grant signal from the central arbiter. This allows these arbitrator outputs to be received in time to control the address signals on the next clock pulse.

The third line of the timing diagram shows signals on the address bus by the various processors which at any one interval have priority as determined by the local arbitrator. During the first interval, P1 sends out an address on the address bus for addressing an odd memory module. During the second interval, P6 sends out an address on the address bus for addressing an even memory module. Also, during interval 2, each of the other processors except for P1 check whether the address which has been sent out on the odd address bus during interval 1 matches any tag in its cache. If this were the case, then that processor would be prepared to respond with the data from its cache memory during intervals 5–8 if the state of the cache entry is "M". The signal that this will happen is sent out on the snoop bus during the third interval and is used by the addressed memory module to cause it to refrain from sending data during clock cycles 5–8, and, possibly to update its contents when the data is sent over the bus; the memory updates its contents for a read signal and refrains for a read to modify signal. During interval 3, P3 which has previously performed a function whereby it recognizes that an entry in its cache which is marked "shared" is to be modified, sends an invalidate signal for that memory address, which is odd, to the other processors so that the other processors mark their copies in their caches of this address invalid; if these processors subsequently wish to address that memory, they will do so by addressing main memory. During clock period 4, P4 sends a similar type of invalidation address on the even bus to all other processors. During intervals 5 and 6, P5 and P2 address odd and even memory modules, respectively, in a manner similar to that discussed previously for P1 and P6. P5 and P2 are selected by their distributed arbitrators for getting access to the address bus for sending an odd and even module address, respectively. During intervals 7 and 8, P8 and P7 send invalidation addresses in the same way as previously discussed with respect to intervals 3 and 4 for processors 3 and 4. During intervals 9 and 10, P4 and P3 access the address bus for accessing odd and even modules of memory in essentially the same way as described earlier for intervals 1 and 2.

In response to these address signals, the memories respond on the odd data bus and the even data bus, as shown in the fourth and fifth lines of FIG. 2. During intervals 5–8, the response to the address generated by P1 during the first interval is sent to P1 over the odd data bus 131. During intervals 9–12, the response to the address generated by P5, during interval 5 is returned over the odd data bus 131. During intervals 13–16, the response to the address generated by P4 during interval 9 is returned over the odd data bus 131. Similarly, on the even data bus 133, during intervals 6–9, the response to the request generated by P6 during interval 2 is returned; during clock cycles 10–13, the response to the address generated by P2 during interval 6 is returned; and during intervals 14–17, the response to the address generated by P3 during interval 10 is returned. In this particular example, processor P3 is receiving data during clock intervals 14–17 from processor P1 which has this data in its own cache marked in the M (modified) state.

The sixth line of the signals on FIG. 2 refers to snoop signals which are processor signals responsive to an address sent out over the address bus 120. The address signal sent out over address bus 120 by P1 during the first interval is received by all the other processors and is compared during the second interval with the tag fields in their respective caches. During the third interval, if any of the processors has found a match, then that processor can send on the snoop bus, one of four signals. A shared signal indicates that the transmitting processor has in its cache a copy of the requested memory and will retain that copy, marked in the "S" state. In response to receipt of a shared signal the processor that requested the reading will mark its cache entry in the shared state. If the processor that received the address had its cache entry in the E (exclusive) state, that processor will change this state to shared and assert the shared signal. The second possible signal on the snoop bus is data intervention. This signal is generated if the processor that received the address has the corresponding cache entry in the M state. In that case, that processor will supply the data instead of the memory module. In response to receiving this data intervention signal, the addressed memory module will not generate a read output, but will update its contents unless the intent to modify signal is asserted. The third signal is an abort signal indicating that the receiving processor is in the process of changing the corresponding memory entry, or is busy servicing a prior request, so that this is not a good time to perform a reading. In response to an abort signal, the reading processor attempts to perform the reading again and is usually successful. Finally, a fourth signal is an error signal indicating an inconsistency between the read request for that memory and the status of the cache associated with the processor generating the error signal. For example, if a first processor attempted to invalidate the cache memory content in a second processor where that cache memory content is marked in the modified state; invalidation is only legitimate if the contents being invalidated are in the shared state.

In the example of FIG. 2, the entries shown for the snoop state refer to the processor whose signals are being responded to. In this particular example, no signals will be generated on the snoop bus during intervals 3, 4, 5, and 6 and 8, 9, 10, and 11. During interval 7, a shared signal is generated by processor P1 because the address generated by processor P5 during clock cycle 5 is, in fact, shared by processor P1. In this case, P5 will mark the memory reading that it receives in the shared state, and P1 will mark its cache entry for that address "shared". During interval 12, the snoop bus contains responses to the address generated by processor P3 during interval 10. In this particular case, P6 has a copy of this memory in its cache and that copy is marked modified. Consequently, P6 will generate a data intervention signal on the snoop bus during interval 12 and will deliver the contents of its cache to the even data bus during intervals 14–17.

It is to be understood that the above description is only of one preferred embodiment of the invention. Numerous other arrangements may be devised by one skilled in the art without departing from the scope of the invention. The invention is thus limited only as defined in the accompanying claims.

We claim:

1. In a multiprocessor system comprising:

a plurality of processor means for processing data;

a plurality of main memory modules; and bus means for interconnecting said processors and said memory modules;

the bus means of the invention comprising:

a single time-shared address bus, for transmitting a plurality of addresses in a plurality of time intervals said addresses identifying data to be accessed in said main memory modules, connected to all of said processor means and all of said memory modules; and first and second data buses, each of said first and second data buses connected to all of said processor means, each of said memory modules connected to only one of said first data bus or said second data bus;

a snoop bus connected to each of said processor means for conveying signals to each of said processor means indicating that one processor of said processor means has detected a match between an address on said address bus and an address of data stored in a cache memory means of said one processor;

wherein each of said memory modules stores data for a contiguous block of addresses, wherein at least one first memory module, connected to the first data bus, and at least one second memory module, connected to the second data bus, receive different addresses during different interleaved sets of time slots from said time-shared address bus, said different interleaved sets of time slots dedicated to each of said memory modules connected to said first and said second data buses, and wherein the memory modules connected to each of the first and second data buses transmit responses at variable time slots with data stored at one of said addresses over said first and said second data buses, respectively, with at least one of the time slots of the responses being transmitted simultaneously.

2. The system of claim 1 wherein each of said processor means comprises cache memory means, for storing data and corresponding addresses, said cache memory means comprising means for checking an address against addresses for which data is stored in said cache memory means, wherein addresses on said address bus are transmitted to said processors for checking by said means for checking against said corresponding addresses of data stored in each said processor cache memory means.

3. The system of claim 2 wherein a protocol, comprising modified, exclusive, shared and invalid states for cache memory contents, is used for cache coherency among said cache memory means, and wherein said address bus transmits invalidation addresses, for invalidating data stored for said invalidation addresses in cache memory means of said processors, to said processors.

4. The system of claim 2 wherein data stored in a cache memory means has one of a plurality of states and wherein said signals convey data characterizing a state of data stored in cache memory means of said one processor for said address.

5. The system of claim 4 wherein for one of said states, said one processor provides data from its cache memory means to one of said data buses.

6. The system of claim 5 wherein for said one of said states, said one processor provides data from its cache memory to one of said memory modules over said one of said data buses.

7. The system of claim 1 wherein each of said first and second data buses carries read signals from ones of said memory modules to any of said plurality of processors means and carries write signals from any of said plurality of processor means to said ones of said memory modules.

8. The system of claim 1 further comprising arbitration means for allocating access to said address bus, said arbitration means comprising a global arbiter common to all of said processor means and a plurality of distributed arbiters each used by one of said processor means.

9. The system of claim 8 wherein all processors which request access to said addressing bus during one arbitration cycle are served once during said cycle, said cycle comprising one or more time slots each time slot for sending one address from one processor, said cycle lasting until all requesting processors are served.

10. The system of claim 8 further comprising an arbitration bus for transmitting signals between said global arbiter and said local arbiters for determining whether a processor using a local arbiter can transmit an address at a next time slot.

11. The system of claim 10 wherein each local arbiter further receives signals from other local arbiters for determining whether a processor means using said each local arbiter can transmit an address at a next time slot.

12. The system of claim 1 wherein said address bus conveys invalidation addresses to said processor means for invalidating data for said invalidation addresses stored in caches of said processor means.

13. The system of claim 12 wherein said time-shared address bus can transmit one address during a time slot, and wherein said address bus is available for transmitting an address for said memory modules during ones of a fixed portion of the time slots, and is available for transmitting an invalidation address whenever an address for accessing a memory module is not being transmitted.

14. The system of claim 1 wherein each of said processor means comprises a cache memory and one of said processor means comprises a peripheral memory controller for controlling a peripheral memory different from said main memory modules, and wherein said one of said processor means transmits invalidation addresses for invalidating data for said invalidation addresses stored in cache memory means of said processor means when said main memory modules are updated from said peripheral memory.

15. The system of claim 1 wherein said address bus and each of said data buses is time shared such that signals are transmittable in consecutive time slots from each of said buses, and wherein each of said main memory modules transmits data, read at an address received over said address bus in one time slot, over one of said first and said second data buses in four consecutive time slots of said one of said first and second data buses, and wherein data is transmittable concurrently in corresponding time slots over said first and said second data buses.

16. The system of claim 19 wherein each processor means is controlled by a clock and wherein each time slot of one of said buses is a multiple of a cycle time of said clock.

17. The system of claim 1 wherein said address bus conveys a plurality of time multiplexed addresses for each data transfer cycle from one of said memory modules, said data transfer cycle corresponding to a transmission of data for one of said plurality of time multiplexed address.

18. A multiprocessor system comprising:
a first plurality of processor means for processing data;
a second plurality of main memory modules; and
bus means for interconnecting said processor means and said memory modules;
the bus means of the invention comprising:
a single time multiplexed address bus for transmitting one address during each time slot of the address bus connected to all of said processor means and all of said memory modules, said address identifying data in said main memory modules; and
first and second data buses, each of said first and second data buses connected to all of said processor means and each of said memory modules connected to only one of said first and second data buses;

wherein each of said memory modules stores data for a contiguous block of addresses, wherein at least one first memory module, connected to the first data bus, and at least one second memory module, connected to the second data bus, receive different addresses during different interleaved sets of time slots from said address bus, said different interleaved sets of time slots dedicated to each of said memory modules connected to said first and said second data buses, and wherein the memory modules connected to each of the first and second data buses transmit responses at different time slots with data stored at one of said addresses over said first and said second data buses, respectively, with at least one of the time slots of the responses being transmitted simultaneously;

wherein each of said processor means comprises cache memory means, for storing data and corresponding addresses and for storing a state of the data for each corresponding address, one of the states being an invalid state wherein addresses on said address bus are transmitted to said processors for checking against said corresponding addresses of data stored in each said processor cache memory means;

wherein said address bus conveys invalidation addresses for invalidating data for said invalidation addresses stored in cache memory means of said processors among said processor means, and said address bus can transmit one address during a time slot, and wherein said address bus transmits addresses to said memory modules during a first half of the time slots, and said address bus conveys said invalidation addresses during a second half of said time slots;

a snoop bus connected to each of said processor means for conveying signals with data characterizing a state of data for a corresponding address of data stored in cache means of one of said processor means, indicating that said one processor has detected a match between an address on said address bus and an address of data stored in cache memory means of said one of said processors;

wherein for one of said states, said one processor means provides data from its cache memory means to one of said first or second data buses and to one of said memory modules;

wherein said address bus conveys to said plurality of processor means and to said plurality of main memory modules a plurality of addresses for each data transfer cycle from one of said memory modules, said data transfer cycle corresponding to a transmission of data for one of said plurality of time multiplexed addresses;

wherein access to said address bus is allocated by arbitration means, comprising a global arbiter and a plurality of distributed arbiters, wherein all processors which request access to said address bus are granted access for a first request before any processor is granted access for a second request;

wherein one of said processor means comprises a peripheral memory controller for controlling a peripheral memory and wherein said one of said processor means transmits invalidation signals when main memory is updated from said peripheral memory.

* * * * *